J. B. McINTYRE.
ANGLE CLAMP FOR CURTAIN STRETCHERS.
APPLICATION FILED MAR. 26, 1917.
1,288,632.
Patented Dec. 24, 1918.
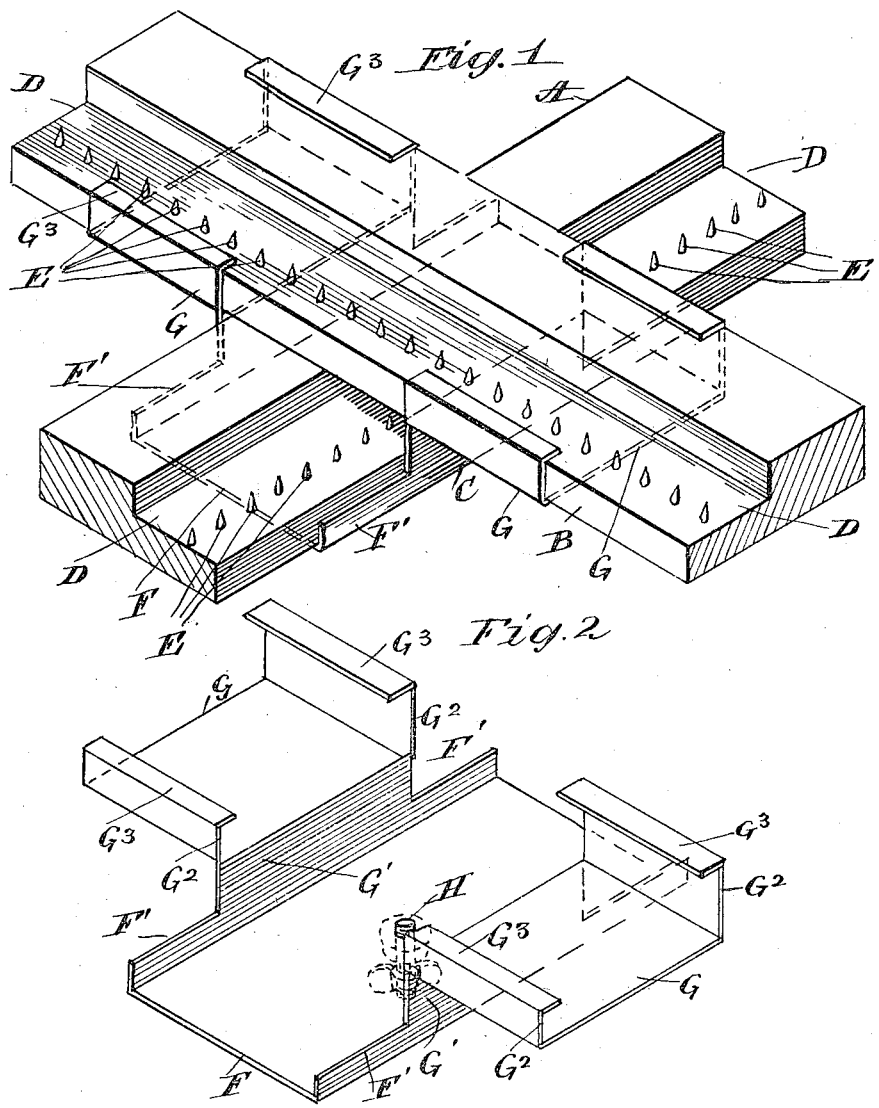

UNITED STATES PATENT OFFICE.

JOHN B. McINTYRE, OF CLEVELAND, OHIO.

ANGLE-CLAMP FOR CURTAIN-STRETCHERS.

1,288,632.

Specification of Letters Patent.

Patented Dec. 24, 1918.

Application filed March 26, 1917. Serial No. 157,440.

*To all whom it may concern:*

Be it known that I, JOHN B. McINTYRE, a citizen of the United States, and resident of Cleveland, in the county of Cuyahoga and State of Ohio, have invented certain new and useful Improvements in Angle-Clamps for Curtain-Stretchers, of which I hereby declare the following to be a full, clear, and exact description, such as will enable others skilled in the art to which it appertains to make and use the same.

The objects of the invention are to provide a rigid adjustable brace and slidable clamp for the crossing extremities of the bars for curtain stretchers or frames.

The invention comprises an integral metal plate, preferably formed of sheet metal and having longitudinal and transverse bearings or guiding and retaining members in which the stretcher bars are longitudinally movable.

It includes a clamping means preventing the movement of the bars when in adjusted position.

In this device the guiding members for the bars are formed at different levels permitting one bar to slide beneath the other, and the upper and lower members are constructed in the form of troughs engaging three sides of the bars and the upper member is provided also with retaining means overlapping the upper face of the upper bar against which the bars are clamped thus preventing them from slipping.

The guiding and holding members are positioned at the required angle to each other, ordinarily a right angle, which is unalterable, and hence the frame composed of these bars clamped together will always remain rigidly in place when the curtain is stretched between them.

The invention is illustrated in the accompanying drawings, hereinafter described and specifically pointed out in the claims.

In the accompanying drawings Figure 1 is an isometric view of the crossing extremities of two curtain frame bars; Fig. 2 is a similar view of the retaining and clamping device therefor.

In these views A and B represent the crossing extremities of two stretcher bars and C represents the retaining and clamping device therefor.

Each bar is provided with a depressed longitudinal portion D on its upper face above which the stretching pins E, E, project. This depression in the lower bar permits the upper bar to slide over the lower one without touching the pins and the depression in the upper bar permits the bars to be positioned interchangeably in the clamps and also reduces the amount of difference between the levels of the pins in the respective bars so that the edges of the curtain will lie more nearly on a common plane.

The clamp C is provided with trough shaped members F and G, G, arranged on upper and lower planes coinciding with the lower faces of the respective bars.

The member F is of unbroken extent and is turned upward at its edges at F', F' to form guides for the lower bar. The upper members G, G, are formed upon each side of the lower member and upon a higher level by vertically extending a portion G' of each upwardly extended edge F' of the lower member. These portions G', G' are then laterally extended at G, G, and form with their upwardly extended edges $G^2$, $G^2$ trough shaped guides or supports for the upper bar.

The upwardly extended members $G^2$ on the upper troughs are provided with inwardly turned upper edges $G^3$, $G^3$ which are positioned at different levels to correspond with the difference in thickness of the two edges of the upper bar, and form abutments against which a screw H serves to press the bars to clamp them securely together. This screw is centrally inserted in the member F and is operated from beneath the frame.

The device is simple and efficient, and of slight initial cost, and maintains the bars in strictly rigid position while in use, but does not prevent them from being quickly adjusted.

Having described the invention what I claim as new and desire to secure by Letters Patent is:

1. The combination with the crossed extremities of stretcher bars, of a clamping means therefor comprising integral trough shaped members arranged at different levels in which said bars are slidable over each other, the upper members extending laterally on both sides of the upper edges of said lower member and inwardly turned retaining means on the upper edges of said upper trough shaped member, the outer retaining means being at a higher level than the inner retaining means, and means for securing said bars rigidly in said trough shaped members.

2. In combination with the crossed bars of a stretcher, said bars having depressed longitudinal portions and provided with stretcher pins in said depressed portions, a clamping device therefor comprising integral members supporting said bars at different levels, in contact with each other, said lower member provided with vertical longitudinal edges engaging the sides of said lower bar, portions of said sides being vertically extended and laterally turned upon each side of said lower member to form said upper members, the longitudinal edges of said upper members being upwardly turned to engage the sides of said upper bar, and provided with inwardly turned edges overlapping the upper face of said upper bar to form abutments at different levels and a clamping screw in said lower member for compressing said bars against said inwardly turned edges.

In testimony whereof, I have hereunto set my hand this 20th day of February, 1917.

JOHN B. McINTYRE.

In presence of—
WM. M. MONROE,
CHAS. C. GOLDMAN.

Copies of this patent may be obtained for five cents each, by addressing the "Commissioner of Patents, Washington, D. C."